ly located followers bear upon the end of the lever 10ª.

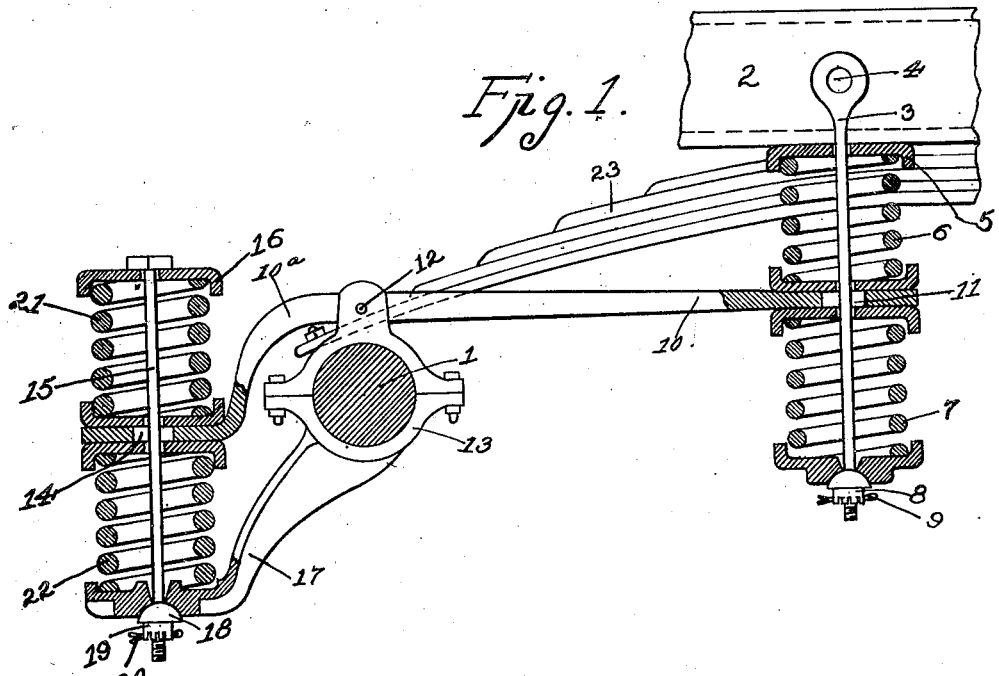
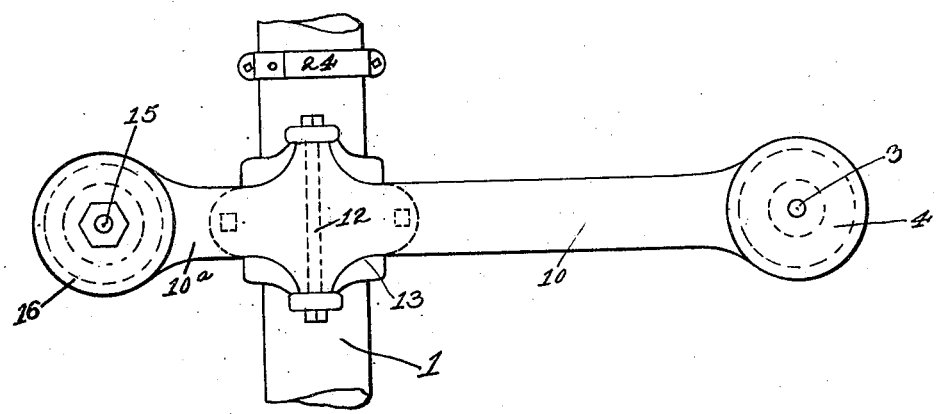

UNITED STATES PATENT OFFICE.

HARRY B. MORGAN, OF ST. LOUIS, MISSOURI.

SHOCK ABSORBER.

1,423,006.     Specification of Letters Patent.     Patented July 18, 1922.

Application filed June 16, 1921. Serial No. 478,107.

*To all whom it may concern:*

Be it known that I, HARRY B. MORGAN, a citizen of the United States, residing at St. Louis, Missouri, have invented a certain new and useful Improvement in Shock Absorbers, of which the following is a full, clear, and exact description, such as will enable others skilled in the art to which it appertains to make and use the same, reference being had to the accompanying drawings, forming part of this application, in which—

Figure 1 is a side elevational view partly in section of my improved shock absorber.

Figure 2 is a top plan view thereof.

This invention relates to a new and useful improvement in shock absorbers designed particularly for use in connection with automobiles, the object being to construct a device which is simple, cheap and easily applied to existing types of cars, and one which is double-acting so far as the spring action is concerned, in absorbing shocks and jars and in taking care of the rebound of the body after a shock.

In the drawings, 1 indicates the axle and 2 a frame member of the chassis. 3 indicates a rod pivotally suspended from a bolt 4 mounted in the chassis, said rod having spring caps or flanged follower plates 5 arranged thereon in pairs with the flanges on each spring follower of a pair presented toward its companion follower.

6 indicates a relatively light and short spring arranged around rod 3 and between the upper pair of followers; and 7 indicates a relatively light and longer spring arranged around rod 3 and between the lower pair of followers.

8 is a castellated nut threaded on the lower end of rod 3 and preferably held against rotation by means of a cotter pin 9.

10 is the long end of an equalizing lever whose extremity is provided with a slot 11 through which rod 3 passes, said extremity being arranged between the medially located followers. Lever 10 is pivoted at 12 to a bracket or split ring 13 clamped to the axle 1. The opposite end 10ª of this equalizing lever is likewise provided with a slot 14 through which passes a bolt 15.

16 are spring followers arranged on rod 15, the pair of followers on the upper end of the rod having their flanges presented toward each other. The intermediately located followers bear upon the end of the lever 10ª.

17 indicates a bracket extension preferably forming a part of the lower half of split ring 13, the outer end of said bracket being formed with a spring seat whose lower face has a concave bearing to receive a semispherical washer 18, said washer being held in position by a castellated nut 19 which is prevented from rotating by means of a cotter pin 20. This nut 19 is threaded upon the lower end of rod 15 and by screwing up the nut 19, the compression of springs 21 and 22 may be adjusted. A similar adjustment of the springs 6 and 7, heretofore described, may be accomplished through the nut 8.

23 indicates the main leaf spring of the car which is secured to the chassis, and its free end attached to a split ring 24 on the axis, as is usual.

The spring followers 5 and 16 are preferably made of pressed metal, and in operation the uppermost spring follower 5 bears against the underside of the chassis thereby providing a relatively fixed support for the upper end of spring 6. The spring bearing on bracket 17 carried by the axle also provides a relatively fixed support for the lower end of spring 22. Springs 6 and 21 are placed under compression by the weight of the chassis, car body and the load carried thereby. Spring 21 bears on the end 10ª of the equalizing lever one half the distance that spring 6 bears on the end 10 of said lever, hence springs 6 and 7 can be much lighter than springs 21 and 22. In other words, if springs 6 and 7 support a load of seven hundred fifty pounds, springs 21 and 22 should be approximately twice as strong so as to support a load of fifteen hundred pounds. Springs 7 and 22 are counterbalancing springs and tend to maintain by their opposition, the ends of the equalizing lever in yielding equilibrium, the function of these springs being primarily to absorb the rebound of the chassis following a shock, as when the wheels of the vehicle pass over an obstruction or depression in the road. The nuts 8 and 19 may be adjusted according to the average load on the chassis; and hence it is usually desirable to make an original adjustment, and then permit nuts 8 and 19 to remain undisturbed until possibly one of the springs takes a permanent set, in which event, the controlling nut will require manipulation to restore working conditions.

What I claim is:

1. A spring supporting device for automobiles comprising an equalizing lever designed to be fulcrumed on the axle to one side of its center, relatively heavy springs above and below the short end of said lever, a bracket carried by the axle and co-operating with one of said springs, relatively light springs above and below the long end of said lever and a bearing for one of said springs, which bearing is relatively fixed with relation to the chassis.

2. In a device of the character described, the combination of a chassis, an axle, a suspension rod pivotally mounted on the chassis, spring followers on said rod, springs interposed between said followers, means for adjusting the compression of said springs, an equalizing lever fulcrumed on the axle and having its end interposed between the medially arranged spring followers on said rod, springs arranged above and below the opposite end of said lever, spring followers co-operating with said last mentioned springs, a rod for holding said spring followers in position, and a fixed spring seat carried by the axle for cooperating with one of said last mentioned springs.

3. The combination with a chassis and an axle, of a bracket mounted on said axle, an equalizing lever fulcrumed on said bracket, a rod pivotally suspended from said chassis, said rod passing through an elongated opening in the end of said lever, springs on said rod and arranged above and below the end of said lever, a spring seat extending from the axle bracket, a spring interposed between said spring seat and the opposite end of said equalizing lever, a rod, passing through said spring seat and a slot in the end of said equalizing lever, a spring follower on the upper end of said rod, a spring interposed between the last mentioned spring follower and the end of said equalizing lever, and a ball and socket connection near the lower end of said rod and axle-supported spring seat.

In testimony whereof I hereunto affix my signature this 9th day of May, 1921.

HARRY B. MORGAN.